May 9, 1961
T. K. SEIBERLING
2,983,643
RUBBER LAMINA, WITH SURFACE ADAPTED TO BE
ADHERED TO ANOTHER SURFACE BY ADHESIVE
Filed April 7, 1958
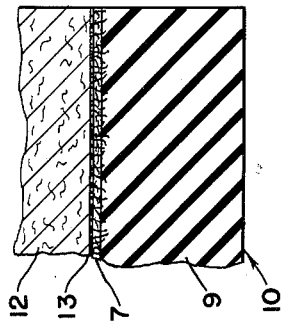
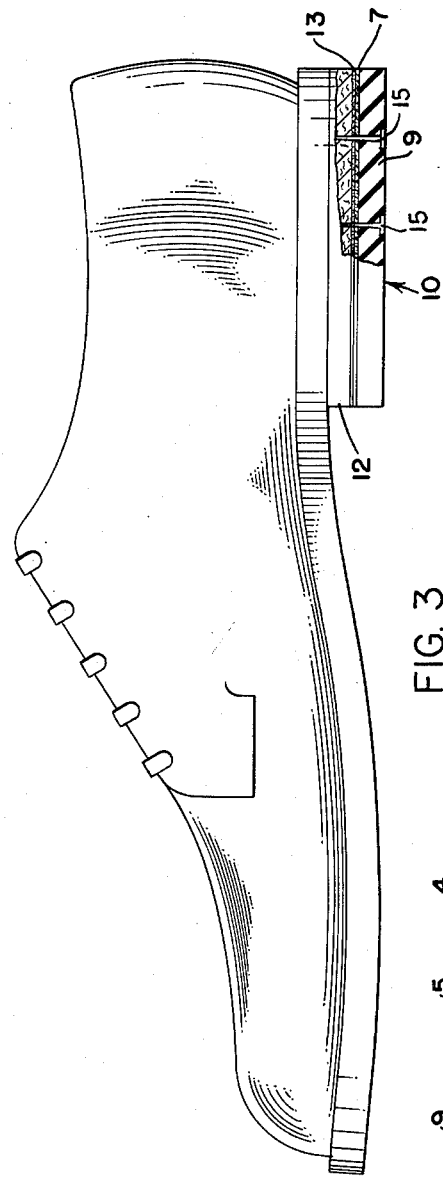
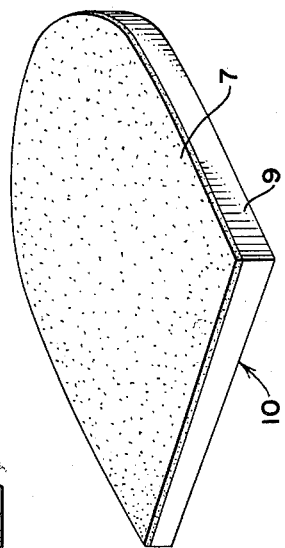
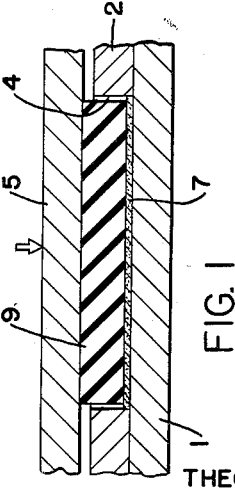
INVENTOR.
THEOPHILUS K. SEIBERLING
BY
*Jordan C. Clark*
ATTORNEY

United States Patent Office 2,983,643
Patented May 9, 1961

2,983,643

RUBBER LAMINA, WITH SURFACE ADAPTED TO BE ADHERED TO ANOTHER SURFACE BY ADHESIVE

Theophilus K. Seiberling, Akron, Ohio, assignor to Seiberling Rubber Company, N.W. Barberton, Ohio, a corporation of Delaware Filed Apr. 7, 1958, Ser. No. 726,919

3 Claims. (Cl. 154—139)

This invention relates to a rubber lamina, the method of producing it, and laminations obtained therewith. The lamina may be a stiff rubber composition. The invention will be described more particularly in connection with a heel. The term "heel" is used herein to refer to that part of a shoe heel which embodies the walking surface and includes whole heels, half heels, top lifts, etc. Although the invention relates more particularly to a heel, it includes other lamina and laminations, for example, soles, etc.

When rubber compositions are to be adhered to another surface by an adhesive, it has been customary in the past to abrade the skin surface of the cured rubber in order to roughen it. Such a roughened surface can be adhered to another surface by an adhesive whereas the cured skin may be so slick that it does not form a good bond with an adhesive. However, abrading is costly in time and labor, it wastes rubber and the surface may not be abraded evenly.

According to this invention, a non-woven fiber mat is incorporated in a surface of the rubber, and the resulting fiber surface is adhesively united to some other surface of a shoe or other product. This is done preferably by placing the fiber material on the bottom of a mold, placing the rubber on this, and then embedding portions of individual fibers in the rubber surface as the rubber is vulcanized. The resulting fibered surface has a texture to which an adhesive can be firmly bonded.

A fiber mat suitable for this purpose is a thin kraft paper. Other papers, preferably unglazed, which do not contain too much filler can be used. Thick papers such as kraft paper 0.005" thick tend to split when used as the bonding medium, whereas a thin kraft paper, for example one which is .0025" thick, does not split. The maximum thickness of a satisfactory mat depends upon the length of the fibers in the mat and whether they are arranged so as to prevent the mat from being cleaved into planes. In thin papers, portions of fibers exposed on one surface of the sheet and embedded in the rubber have other portions exposed on the other surface of the sheet and these become embedded in the adhesive. Where opposite ends (or other portions) of the same fibers are embedded in the two different media, splitting or cleaving of the mat is prevented.

The invention pertains particularly to heels, such as whole heels, half heels, top lifts, etc. for men's, women's and children's shoes. Fibers exposed at the surface form a strong bond even with aqueous bone glue which is a preferred adhesive for this purpose. If an aqueous glue is to be used, the fibers of the heel or other lamina are advantageously of cellulosic composition such as wood fibers, cotton fibers, etc. because cellulosic fibers are readily wet by water. Such glue or other adhesive is used to hold the laminae of a top lift together until the top lift is nailed to the heel base.

Ordinarily the fibers will completely cover one entire surface of the heel, but this is not necessary as the rubber may penetrate through minor areas of the fibers, whether the fibers be loose or in the form of a thin paper or the like.

The invention will be further described in connection with the production of heels and shoes, although it is to be understood that it is not limited thereto, and a rubber sheet with a cured skin surface which has fibers incorporated therein may be united to wood or other surfaces to which adhesives will adhere. The invention is not dependent upon the shape or thickness of the lamina.

Heel molds are ordinarily formed of a face plate, a middle plate and a back plate. The middle plate may have many cavities in it, for example, sixty. If paper is used, a single sheet may cover the whole of one plate with only a limited area exposed in each cavity for use in the production of a heel. Alternatively, a piece of paper cut to shape may be put in each mold cavity. If loose fibers are employed they preferably will be distributed over the bottom of each mold cavity. Rubber is put in each mold cavity and vulcanized, so that fibers of the mat are embedded in one surface of the molded rubber product. The invention, in its broadest aspects is not limited with respect to the nature of the fibers used, the mold employed, or how the fibers are incorporated in the vulcanized surface.

The invention will be further described in connection with the accompanying drawings, which are illustrative of the equipment that may be used, the shoe which may be used, the manner of proceeding, etc. In the drawings—

Fig. 1 is a section through a heel mold containing a paper and rubber, and shows the mold being closed;

Fig. 2 is a view in perspective of a finished top lift;

Fig. 3 is a side view of a completed shoe; and

Fig. 4 is an enlarged sectional detail showing the top lift and the heel base bonded together.

Figure 1 illustrates any mold. It comprises a back plate 1 which is shown as being perfectly flat, although it may have a rand around its edge, it may have a boss in its center, or it may be otherwise shaped as desired. The middle plate 2 is provided with openings which form molding cavities 4, of which only one is shown in the drawing. The face plate 5 may be engraved on its cavity surface to produce a desired design in the walking surface of the heel, although in the drawing it is illustrated as perfectly flat.

The mold, after being heated to vulcanizing temperature is removed from the press, as shown. The face plate 5 is removed, a suitably shaped piece of kraft paper 7 (.0025 inch thick) is placed in the bottom of the mold, a biscuit of unvulcanized rubber 9 is put in the mold, the face plate 5 is replaced, and the mold is returned to the press where the plate 5 is pressed flat on to the middle plate so that the rubber is pressed into intimate contact with the paper and fills the mold. The rubber is then vulcanized. This permanently bonds the paper into the surface of the rubber.

After vulcanization and removal of the heel from the mold it may be desirable to brush the fibered surface so that the fibers stand out from the surface so that they will be embedded in the adhesive. This may not be necessary.

The heel 10 shown in Fig. 2 is a top lift and is formed in the manner described. On the exposed surface of the paper are the ends of fibers the opposite ends of which are embedded in the rubber. When this top lift is adhered to the heel base 12 by aqueous bone glue, cement or other adhesive 13, the exposed fiber ends become embedded in the adhesive. Figure 4 shows many of the fibers with one end vulcanized in the top lift and the other end in the adhesive layer. The heel is then permanently secured to the heel base by nails 15.

Heels adhered to a heel base in this manner, are held there in a satisfactory manner.

The kind and shape of the paper or other fiber will be made to meet the conditions which present themselves. If there is a boss on the back plate of the mold, the paper may be cut to fit around it. If an article other than a heel is being made, the shape of the paper, etc. will be varied as required. The rubber may be calendered, tubed, molded or shaped by other means into a sheet and have a sheet of paper cured in one surface or more than one surface; and articles can be cut therefrom as desired.

The term "rubber" is used herein to include natural and synthetic rubbers and mixtures thereof.

The invention is covered in the claims which follow.

What I claim is:

1. The process of producing a laminate of a thermosettable plastic and a sheet of paper, the paper being so thin that one portion of many of the fibers thereof is exposed on one surface and another portion of the same fibers is exposed on the opposite surface, which process comprises embedding said portion of the fibers on one surface of the paper in the plastic while bringing a molding surface into pressure contact with the opposite surface of the paper, then setting the plastic, and thereafter separating the molding surface and the resulting laminate.

2. The method of producing a plastic product which comprises placing in the bottom of a mold a piece of paper so thin that many of the fibers on the surface of the sheet adjacent the bottom of the mold extend through the paper with other portions of the same fibers exposed on the opposite side of the sheet, and then molding and setting a thermosettable plastic in the mold with at least many of said other portions of the same fibers embedded therein.

3. The method of producing a lamination which comprises embedding in one surface of an uncured rubber lamina a thin sheet of paper comprising many fibers one portion of each of which is to be embedded in the rubber with another portion of the same exposed at the surface of the sheet opposite that which contacts the rubber, curing the rubber with said one portion of the fibers embedded therein and said other portion of the fibers exposed, brushing the exposed surface of the paper and thereby freeing ends of the exposed portions of the fibers from adherence to the rest of the paper, and then uniting the surface of the lamina to another lamina by an adhesive in which said exposed portions of the fibers are embedded.

References Cited in the file of this patent

UNITED STATES PATENTS

| Number | Name | Date |
|---|---|---|
| 1,524,335 | Brown | Jan. 27, 1925 |
| 1,559,571 | Hadaway | Nov. 3, 1925 |
| 1,735,369 | Willis | Nov. 12, 1929 |
| 1,751,557 | Roberts | Mar. 25, 1930 |
| 1,770,671 | Rudolph | July 15, 1930 |
| 1,791,200 | Gilowitz | Feb. 3, 1931 |
| 1,821,633 | Gilowitz | Sept. 1, 1931 |
| 1,948,390 | Mebane | Feb. 20, 1934 |
| 2,090,244 | Waters | Aug. 17, 1937 |
| 2,401,946 | Littlefield | June 11, 1946 |
| 2,448,357 | Craig et al. | Aug. 31, 1948 |
| 2,587,171 | Knewstubb | Feb. 26, 1952 |